(12) United States Patent
Lee

(10) Patent No.: US 12,721,699 B2
(45) Date of Patent: Sep. 1, 2026

(54) DENTAL COIL SPRING EXTENSION DEVICE

(71) Applicant: Eun Seung Lee, Seoul (KR)

(72) Inventor: Eun Seung Lee, Seoul (KR)

( * ) Notice: Subject to any disclaimer, the term of this patent is extended or adjusted under 35 U.S.C. 154(b) by 368 days.

(21) Appl. No.: 18/243,640

(22) Filed: Sep. 7, 2023

(65) Prior Publication Data

US 2024/0148473 A1 May 9, 2024

(30) Foreign Application Priority Data

Nov. 8, 2022 (KR) ........................ 10-2022-0148119

(51) Int. Cl.
*A61C 7/02* (2006.01)
*A61C 3/00* (2006.01)

(52) U.S. Cl.
CPC . *A61C 7/02* (2013.01); *A61C 3/00* (2013.01)

(58) Field of Classification Search
CPC ........... A61C 7/02; A61C 7/306; A61C 7/026; B25B 27/30; B25B 27/302; B25B 27/304; B25B 27/306; B25B 27/308
See application file for complete search history.

(56) References Cited

U.S. PATENT DOCUMENTS 1,951,953 A * 3/1934 Tollonitsch ........... B25B 27/306 29/268
2,329,591 A * 9/1943 Christian ............. B25B 27/306 254/10.5
2,883,742 A * 4/1959 Prath ..................... B25B 27/306 29/215
2,885,769 A * 5/1959 Brown .................. B25B 27/306 254/98
3,747,895 A * 7/1973 Martin .................. B25B 27/306 29/227
5,154,398 A * 10/1992 Mayfield ................ B25B 27/30 269/6
5,367,755 A * 11/1994 Wood ................... B25B 27/306 29/268
2010/0071716 A1 3/2010 Rivera

FOREIGN PATENT DOCUMENTS

CN 202123040526.7 U 12/2021

* cited by examiner

*Primary Examiner* — Heidi M Eide
(74) *Attorney, Agent, or Firm* — LEEPI

(57) ABSTRACT

A dental coil spring extension device capable of extending a pitch of the dental coil spring is disclosed. The dental coil spring extension device includes a first grip part, a second grip part, and an extension part. The first grip part grips one coil of a coil spring. The second grip part grips the other coil of the coil spring. The extension part separates the first grip part and the second grip part to expand a distance between the one coil and the other coil. Each of the first grip part and the second grip part includes a recessed portion formed to surround a periphery of each of the one coil and the other coil of the coil spring. Thus, the load deflection rate of the dental coil spring itself may be increased, and the need for additional crimpable stops or arch wire replacement may be eliminated.

4 Claims, 9 Drawing Sheets

DENTAL COIL SPRING EXTENSION DEVICE

CROSS-REFERENCE TO RELATED APPLICATIONS

This application claims priority under 35 U.S.C. § 119 to Korean Patent Application No. 10-2022-0148119, filed on Nov. 8, 2022 in the Korean Intellectual Property Office (KIPO), the contents of which are herein incorporated by reference in their entirety.

BACKGROUND OF THE INVENTION

Technical Field

Exemplary embodiments of the present invention relate to a dental coil spring extension device. More particularly, exemplary embodiments of the present invention relate to a dental coil spring extension device capable of extending a pitch of the dental coil spring.

Discussion of the Related Art

In general, a dental coil spring includes an open coil spring used to secure a space between teeth and a closed coil spring used to maintain the secured space. The open coil spring is used in the alignment or leveling stage of teeth, and is used to maintain space or secure additional space. The open coil spring having a length slightly longer than the length between the brackets is compressed and inserted between the brackets.

When an orthodontist wants to arrange the teeth after securing a space between the teeth, the space is maintained or secured with a coil spring instead of inserting an arch wire into a corresponding tooth bracket.

In other words, coil springs are often used in maxillary lateral incisors or mandibular premolars with crossbite. When trying to secure a space, an open coil spring is inserted longer than a distance between brackets. Depending on how much longer the length of the open coil spring is than the distance between the brackets, a force (that is, the orthodontic force) transmitted to the teeth on both sides increases. The orthodontic force applied to the teeth should be optimally applied according to a situation. Therefore, a length of the open coil spring must be carefully determined by an orthodontist.

On the other hand, it takes a lot of time to replace a new open coil spring with an appropriate length after removing an arch wire from an oral cavity at every visit.

That is, after removing an arch wire ligated to a bracket, a new coil spring is replaced with a longer size. Thereafter, the arch wire is ligated again, but this method is cumbersome and takes a lot of time.

Also, during replacement of the coil spring, a patient may be stabbed by the arch wire. In addition, if a small-sized coil spring is missed, there is a risk that the patient will aspirate the missed coil spring. In addition, since the coil spring must be cut to an appropriate length by calculating by eye, it is difficult to apply precise force.

SUMMARY

Exemplary embodiments of the present invention provide a dental coil spring extension device capable of extending a pitch of a dental coil spring without replacing the dental coil spring.

According to one aspect of the present invention, a dental coil spring extension device includes a first grip part, a second grip part and an extension part. The first grip part grips one coil of a coil spring. The second grip part grips the other coil of the coil spring. The extension part separates the first grip part and the second grip part to expand a distance between the one coil and the other coil. Here, each of the first grip part and the second grip part includes a recessed portion formed to surround a periphery of each of the one coil and the other coil of the coil spring.

In an exemplary embodiment of the present invention, a thickness of the recessed portion may become thinner as a distance from a center of the recessed portion is decreased.

In an exemplary embodiment of the present invention, the extension part may include a thumb grip part, a residual finger grip part and a gap setting part. The thumb grip part may be connected to the first grip part. The residual finger grip part may be connected to the second grip part. The gap setting part may be disposed between the thumb grip part and the residual finger grip part to set a distance between the first grip part and the second grip part.

In an exemplary embodiment of the present invention, the gap setting part may include a gap adjusting cylinder, a gap adjusting plate and a gap adjusting rod. The gap adjusting cylinder may have one side fastened to a hole formed in the thumb grip part. The gap adjusting plate may be disposed in an area in which a portion of an outer peripheral surface of the gap adjusting cylinder is opened and fastened to a hole formed in the thumb grip part. The gap adjusting rod may have a cylindrical shape and may be disposed inside the gap adjusting cylinder to set the distance between the first grip part and the second grip part.

In an exemplary embodiment of the present invention, the gap control rod may include a spring guide, a wide width setting part, a narrow width setting part and a gripping portion. The spring guide may guide the coil spring. The wide width setting part may be formed at a first height. The narrow width setting part may be formed with a second height greater than the first height. The gripping portion may fasten portion fastened to the residual finger grip part through a hole formed in the gap adjusting cylinder.

In an exemplary embodiment of the present invention, the gap control rod may further include a gap control dial that rotates according to a user's manipulation to change positions of the wide width setting part and the narrow width setting part within the gap adjusting rod.

In an exemplary embodiment of the present invention, the extension part may include a first extension part, a second extension part, a hinge portion, a first handle and a second handle. The first extension part may be connected to the first grip part. The second extension part may be connected to the second grip part. The hinge portion may be defined by fastening a first protrusion protruding from a portion of the first extension part and a second protrusion portion protruding from a portion of the second extension part to each other. The first handle may be connected to the first extension part. The second handle may be connected to the second extension part.

In an exemplary embodiment of the present invention, the first grip part, the first extension part and the first handle may be integrally formed, and the second grip part, the second extension part and the second handle may be integrally formed.

In an exemplary embodiment of the present invention, the dental coil spring extension device may further include an elastic plate disposed between the first handle and the second handle.

In an exemplary embodiment of the present invention, the dental coil spring extension device may further include a self-limiting screw member for limiting a maximum distance set between the first grip part and the second grip part.

In an exemplary embodiment of the present invention, the extension part may include a third extension part, a penetration rod, a fourth extension part, a first branch part, a second branch part, a hinge portion, a first handle and a second handle. The penetration rod may have one end rotatably connected to the third extension part and the other end connected to the first grip part. The first branch part may have one side extending along a Y-axis from the fourth extension part and a first penetrating hole formed to pass the penetrating rod. The second branch part may have one side extending along an X-axis from the fourth extension part, the other side connected to the second grip part, and a second penetration hole formed to pass the penetration rod. The hinge portion may be formed in a region where the third extension part and the fourth extension part intersect. The first handle may be connected to the third extension part. The second handle may be connected to the fourth extension part.

In an exemplary embodiment of the present invention, the first grip part and the penetration rod may be integrally formed. The third extension part and the first handle may be integrally formed. The second grip part, the first branch part, the second branch part, the fourth extension part and the second handle may be integrally formed.

In an exemplary embodiment of the present invention, the dental coil spring extension device may further include an elastic plate disposed between the first handle and the second handle.

In an exemplary embodiment of the present invention, the dental coil spring extension device may further include a self-limiting screw member for limiting a maximum distance set between the first grip part and the second grip part.

According to some exemplary embodiments of the present invention, by extending the pitch of the dental coil spring, it is possible to increase the load deflection rate of the dental coil spring itself, thereby eliminating the need for additional crimpable stops or arch wire replacement.

BRIEF DESCRIPTION OF THE DRAWINGS

The above and other features and aspects of the present invention will become more apparent by describing in detailed exemplary embodiments thereof with reference to the accompanying drawings, in which.

DETAILED DESCRIPTION OF THE INVENTION

Figure 1:
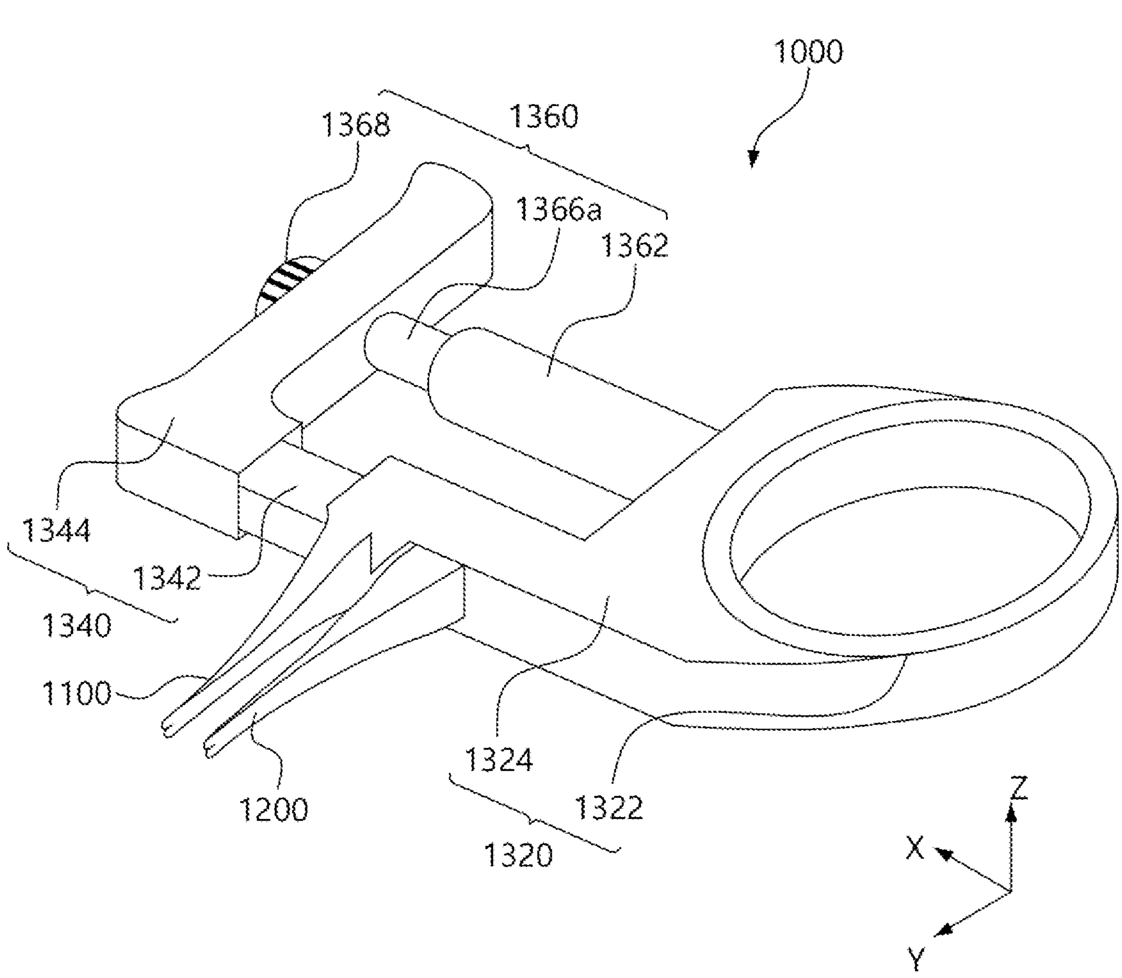
FIG. 1 is a perspective view schematically illustrating a dental coil spring extension device according to an exemplary embodiment of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
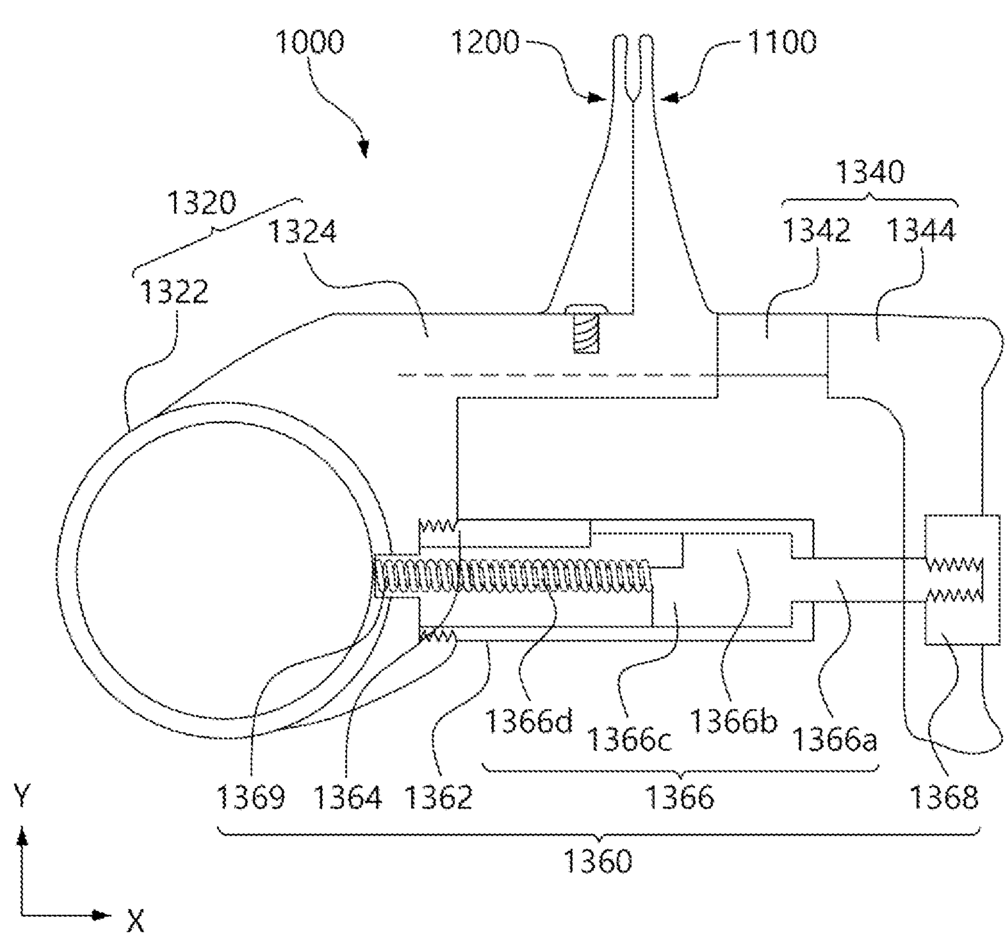
FIG. 2 is a cross-sectional view illustrating the dental coil spring extension device shown in FIG. 1.
Figure 3A:
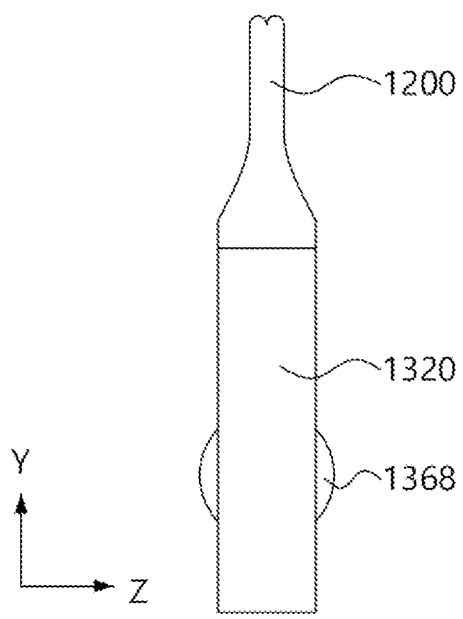
FIG. 3A, FIG. 3B and FIG. 3C are a right side view, a left side view and a top view illustrating the dental coil spring extension device shown in FIG. 1, respectively.
Figure 3B:
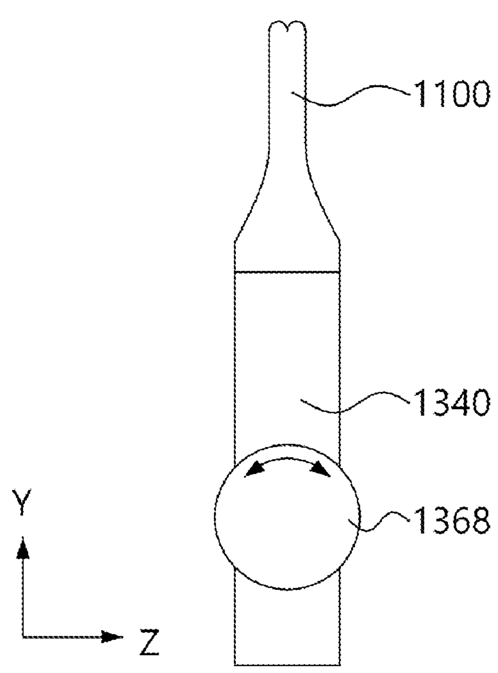
Figure 3C:
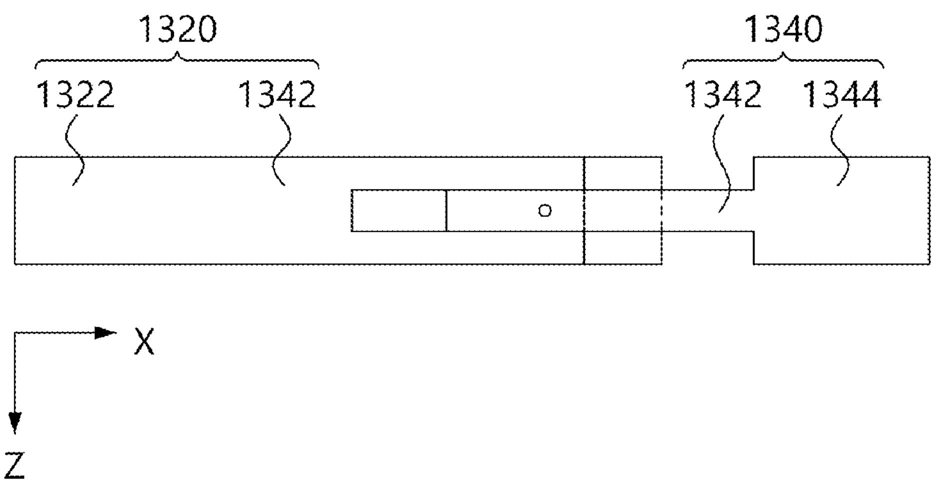

FIG. 1 is a perspective view schematically illustrating a dental coil spring extension device according to an exemplary embodiment of the present invention. FIG. 2 is a cross-sectional view illustrating the dental coil spring extension device shown in FIG. 1. FIG. 3A, FIG. 3B and FIG. 3C are a right side view, a left side view and a top view illustrating the dental coil spring extension device shown in FIG. 1, respectively.

Referring to FIG. 1 to FIG. 3C, the dental coil spring extension device 1000 according to an exemplary embodiment of the present invention includes a first grip part 1100, a second grip part 1200 and an extension part 1300 to extend a pitch of a dental coil spring. In the present exemplary embodiment, the dental coil spring may be an open coil spring used to secure a space or a closed coil spring used to maintain the secured space.

For example, the open coil spring is classified into a NiTi open coil spring, an Elgiloy open coil spring and a stainless steel (SS) open coil spring according to a material of the spring.

The first grip part 1100 protrudes along a Y-axis direction to grip one coil of the coil spring, and the second grip part 1200 protrudes along a Y-axis direction to grip the other coil of the coil spring.

Each of the first grip part 1100 and the second grip part 1200 includes a recessed portion formed to surround a periphery of a coil of the coil spring. The recessed portion may have a thickness that becomes thinner as it approached a center of the recessed portion.

The extension part 1300 includes a thumb grip part 1320, a residual finger grip part 1340 and a gap setting part 1360. The extension part 1300 may separate the first grip part 1100 and the second grip part 1200 from each other to extend a distance between one coil and the other coil of the coil spring.

The thumb grip part 1320 includes a ring part 1322 for inserting a thumb and a first connection part 1324 extending from the ring part 1322 and connected to the first grip part 1100. The thumb grip part 1320 may be connected to the first grip part 1100.

The residual finger grip part 1340 includes a rod part 1342 for supporting the residual fingers and a second connection port 1344 extending from the rod part 1342 and connected to the second grip part 1200. The residual finger grip part 1340 may be connected to the second grip part 1200.

The gap setting part 1360 includes a gap adjusting cylinder 1362, a gap adjusting plate 1364, a gap adjusting rod 1366, a gap adjusting dial 1368 and a gap adjusting spring 1369. The gap setting part 1360 may be disposed between the thumb grip part 1320 and the residual finger grip part 1340 to set a gap between the first grip part 1100 and the second grip part 1200.

One side of the gap control cylinder 1362 is fastened to a hole formed in a side of the thumb grip part 1320.

The gap adjusting plate 1364 is disposed in an area in which a portion of an outer peripheral surface of the gap adjusting cylinder 1362 is opened, and is fastened to a hole formed in the thumb grip part 1320.

The gap adjusting rod 1366 includes a fastening portion 1366*a*, a wide width setting portion 1366*b*, a narrow width setting portion 1366*c* and a spring guide 1366*d*. The gap adjusting rod 1366 may have a cylindrical shape to be disposed inside the gap adjusting cylinder 1362 to set a gap between the first grip part 1100 and the second grip part 1200. When the wide width setting portion 1366*b* is disposed to face the gap adjusting plate 1364, a maximum interval between the first grip part 1100 and the second grip part 1200 may be set to a first interval. In addition, when the narrow width setting portion 1366*c* is disposed to face the gap adjusting plate 1364, a maximum interval between the first grip part 1100 and the second grip part 1200 may be set to a second interval. In the present exemplary embodiment, the first interval may be greater than the second interval.

The gap adjusting dial 1368 is rotated according to an operation of user to change positions of the wide width setting portion 1366*b* and the narrow width setting portion 1366*c* within the gap adjusting cylinder 1362. That is, the gap adjusting dial 1368 rotates so that the wide width setting portion 1366*b* corresponds to the gap adjusting plate 1364 or the narrow width setting portion 1366*c* corresponds to the gap adjusting plate 1364 within the gap adjusting cylinder 1362.

One side of the gap adjusting spring 1369 is inserted into the spring guide 1366*d*, and the other end of the gap adjusting spring 1369 is disposed in a hole formed at a side of the thumb holding part 1320. Accordingly, as the thumb grip part 1320 and the residual finger grip part 1340 come close to each other by the user's pressure, the gap adjusting spring 1369 is reduced. When the user releases the pressure, a gap adjusting spring 1369 is extended to separate the thumb grip part 1320 from the residual finger grip part 1340.

Figure 4:
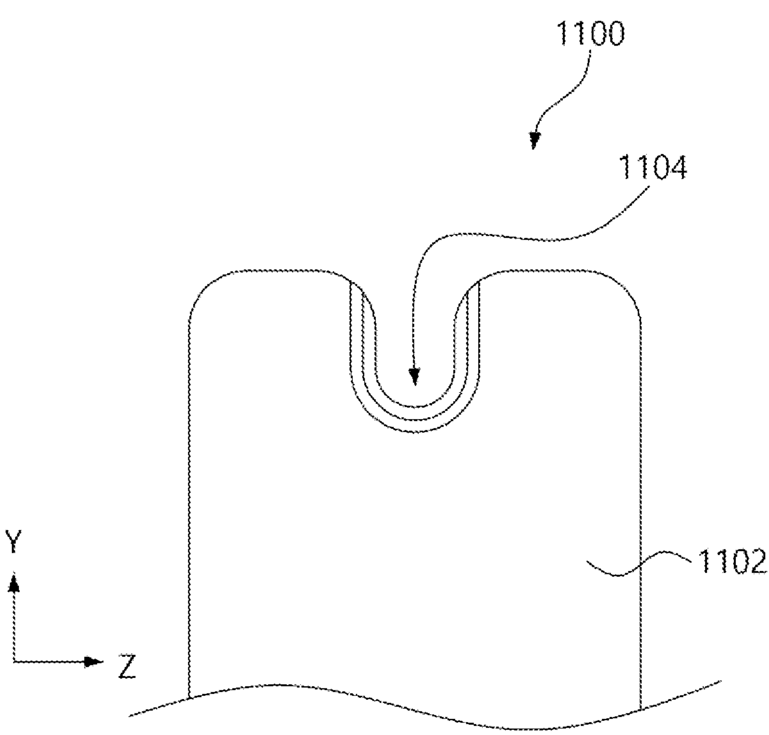
FIG. 4 is an enlarged plan view illustrating a first grip part.

FIG. 4 is an enlarged plan view illustrating a first grip part 1100.

Referring to FIG. 1 to FIG. 4, the first grip part 1100 includes a grip body 1102 and a recessed portion 1104 formed at a tip of the grip body 1102 to surround a coil of a coil spring. The recessed portion 1104 may have a thickness that becomes thinner as it approaches a center of the recessed portion 1104. That is, as a distance from the center of the recessed portion 1104 increases, a thickness of the recessed portion 1104 increases.

In the present exemplary embodiment, it has been described that the recessed portion 1104 is formed at a tip of the first grip part 1100, but the recessed portion 1104 is also formed at a tip of the second grip part 1200. Since the recessed portion formed in the second grip part 1200 is the same as the recessed portion 1104 formed in the first grip part 1100, a detailed description thereof will be omitted.

Figure 5:
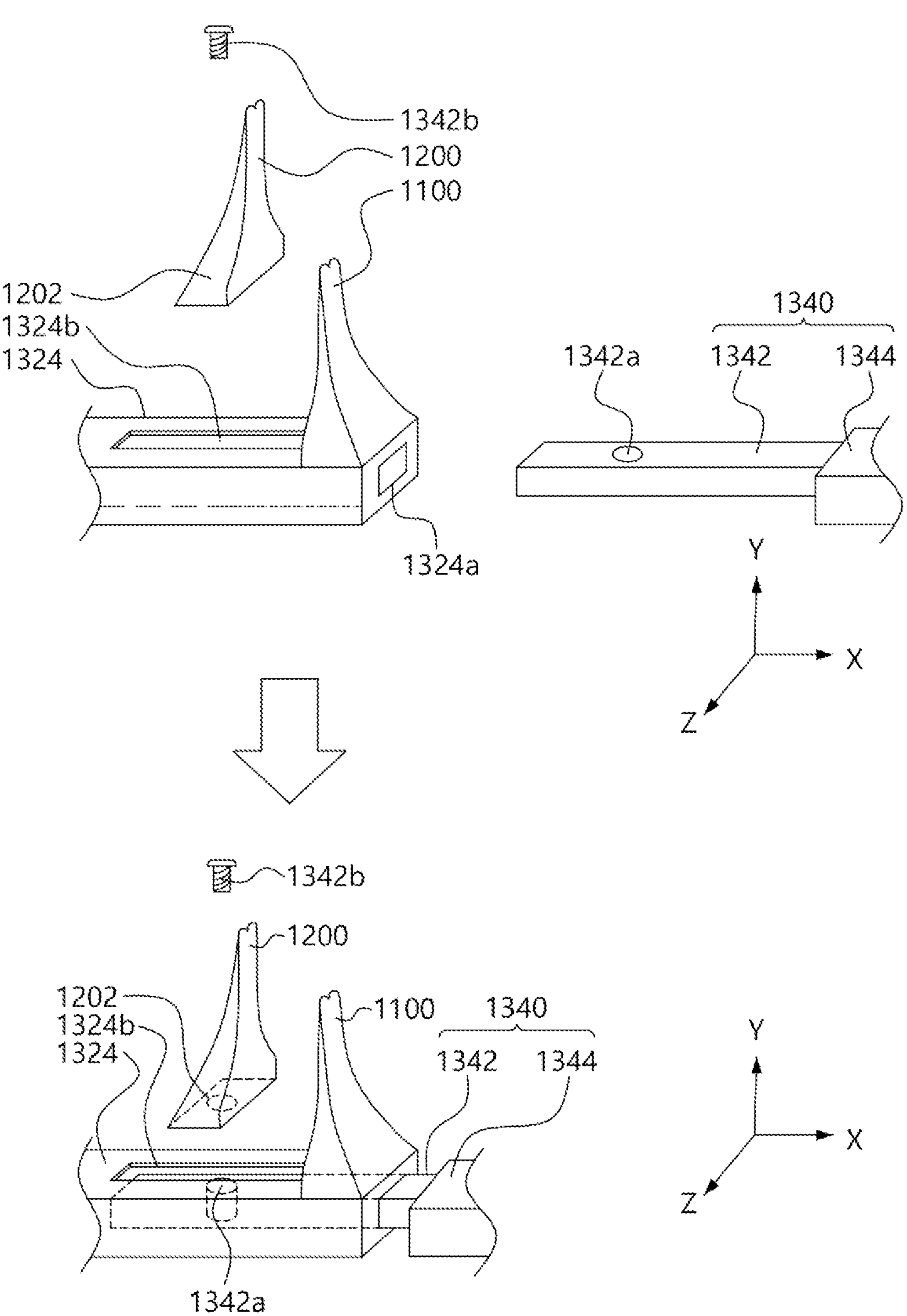
FIG. 5 is perspective views illustrating an arrangement process of a first grip part and a second grip part.

FIG. 5 is perspective views illustrating an arrangement process of a first grip part 1100 and a second grip part 1200.

Referring to FIG. 1 to FIG. 5, the first grip part 1100 extending along a Y-axis direction is disposed at an end of the first connection part 1324 extending along an X-axis direction. An insertion hole 1324*a* for inserting a rod part 1342 is formed in one side surface of the first connection part 1324 along a length direction of the first connection part 1324.

A slit 1324*b* is formed on an upper surface of the first connection part 1324 along a length direction of the first connection part 1324. A length of the slit 1324*b* may correspond to the maximum distance set between the first grip part 1100 and the second grip part 1200.

A fastening groove 1342*a* for screw member fastening is formed on an upper surface of the rod part 1342. A hole 1202 for screw member fastening may be formed in the second grip part 1200 for fastening the screw member.

After the rod part 1342 is inserted into an insertion hole 1324*a* formed in the first connection part 1324, the second grip part 1200 is fastened to a fastening hole 1342*a* of the rod part 1342 exposed through the slit 1324*b* formed in the first connection part 1324 through a screw member 1342*b*.

Figure 6A:
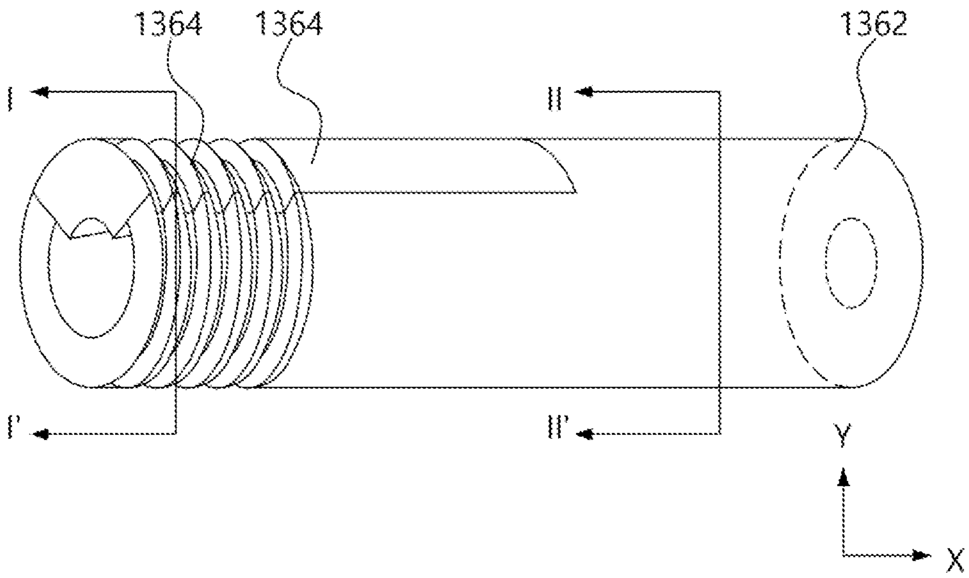
FIG. 6A, FIG. 6B and FIG. 6C are a perspective view illustrating a gap adjusting cylinder and a gap adjusting plate, a cross-sectional view taken along a line I-I', and a cross-sectional view taken along a line respectively.
Figure 6B:
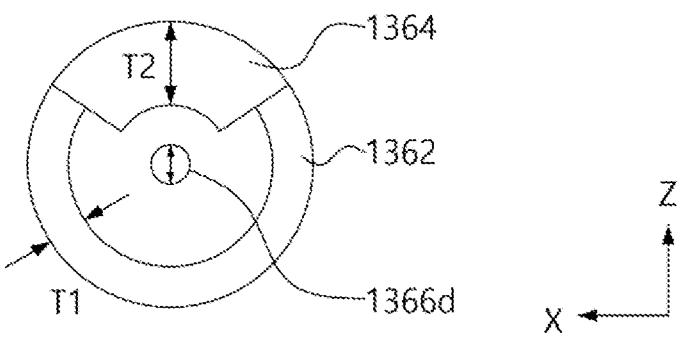
Figure 6C:
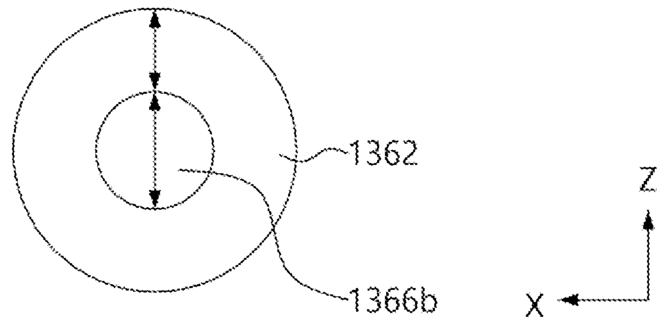

FIG. 6A, FIG. 6B and FIG. 6C are a perspective view illustrating a gap adjusting cylinder 1362 and a gap adjusting plate 1364, a cross-sectional view taken along a line and a cross-sectional view taken along a line respectively.

Referring to FIG. 1 to FIG. 6C, a screw thread is formed on a peripheral of the gap adjusting cylinder 1362 to be coupled to the ring part 1322 of the thumb grip part 1320. Here, a screw thread for fastening the gap adjusting cylinder 1362 is formed on a side portion of the ring portion 1322 of the thumb gripping portion 1320.

The peripheral of the gap adjusting cylinder 1362 is opened for an arrangement of the gap adjusting plate 1364.

The gap adjusting plate 1364 has a shape that is rounded on an YZ-plane and extends along an X-axis direction so as to be seated in an opening of the gap adjusting cylinder 1362. Thus, the gap adjusting plate 1364 and the gap adjusting cylinder 1362 may have a cylindrical shape.

In the present exemplary embodiment, a thickness of the gap adjusting cylinder 1362 is a first thickness T1, and a thickness of the gap adjusting plate 1364 is a second thickness T2 greater than the first thickness T1. Thus, when the gap adjusting rod 1366 is rotated within the gap adjusting cylinder 1362 so that the wide width setting portion 1366*b* faces the gap adjusting plate 1364, the maximum gap between the first grip part 1100 and the second grip part 1200 may be set to a first gap by the gap adjusting plate 1364.

Meanwhile, when the gap adjusting rod 1366 is rotated within the gap adjusting cylinder 1362 so that the narrow width setting portion 1366*c* faces the gap adjusting plate 1364, the maximum gap between the first grip part 1100 and the second grip part 1200 may be set to a second gap by the gap adjusting plate 1364.

As described above, according to the dental coil spring extension device according to an embodiment of the present invention, an extension part that separates a first grip part for gripping one coil and a second grip part for gripping the other coil from each other includes a thumb grip part connected to the first grip part, a residual finger grip pat connected to the second grip part, and a gap setting part disposed between the thumb grip part and the residual finger grip part to set a distance between the first grip part and the second grip part. When the thumb grip part and the residual finger grip part come into close contact with each other by a user, the first grip part and the second grip part are separated from each other by a gap set by the gap setting part. The gap between the first grip part and the second grip part may expand the dental coil spring. By extending the pitch of the dental coil spring, it is possible to increase the load deflection rate of the dental coil spring itself, thereby eliminating the need for additional crimpable stops or arch wire replacement.

Figure 7:
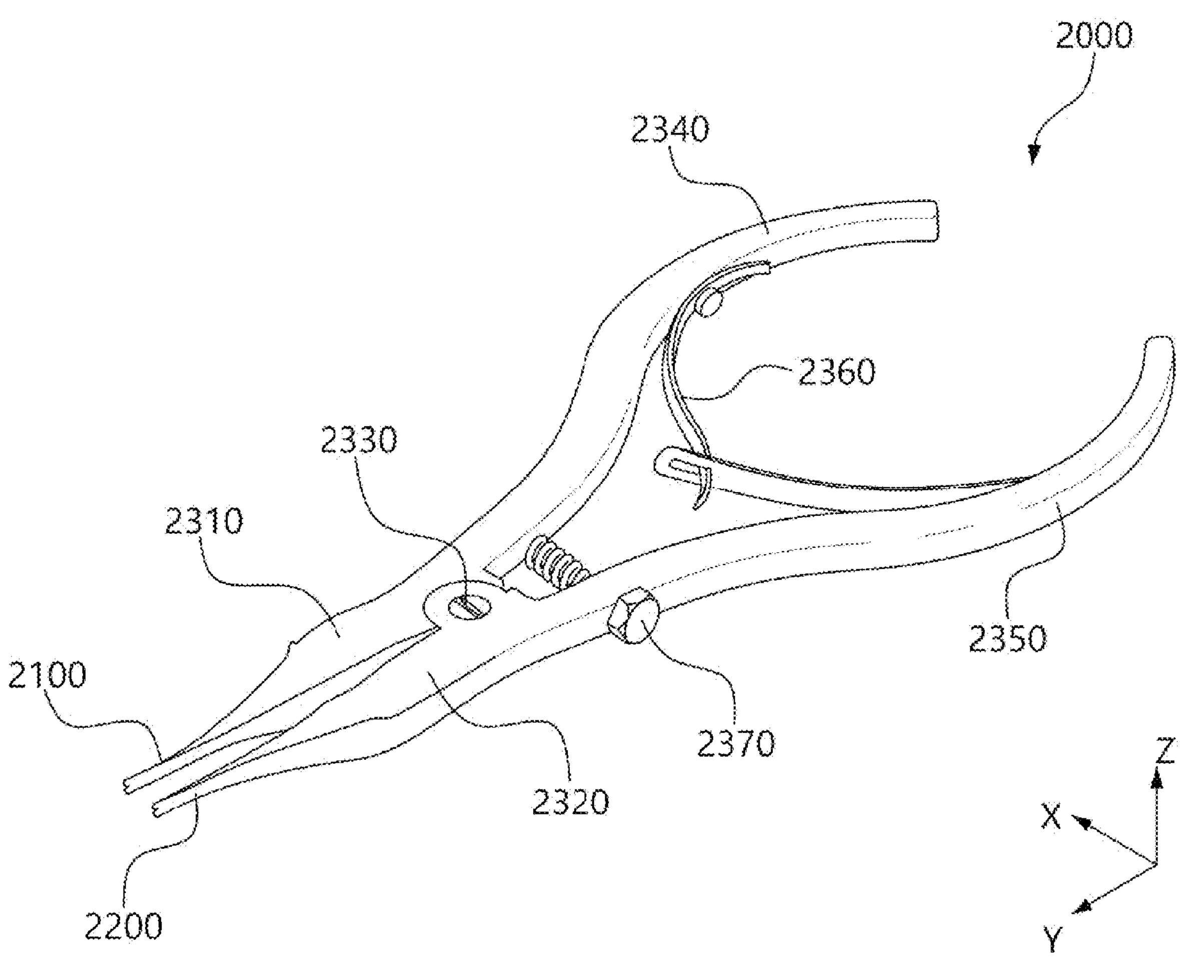
FIG. 7 is a perspective view schematically illustrating a dental coil spring extension device according to another exemplary embodiment of the present invention.

FIG. 7 is a perspective view schematically illustrating a dental coil spring extension device according to another exemplary embodiment of the present invention.

Referring to FIG. 7, the dental coil spring extension device 2000 according to another embodiment of the present invention includes a first grip part 2100, a second grip part 2200 and an extension part 2300 to extend a pitch of a dental coil spring.

The first grip part 2100 protrudes along a Y-axis direction to grip one coil of the coil spring, and the second grip part 2200 protrudes along a Y-axis direction to grip the other coil of the coil spring.

Each of the first grip part 2100 and the second grip part 2200 includes a recessed portion formed to surround a periphery of a coil of the coil spring. The recessed portion may have a thickness that becomes thinner as it approached a center of the recessed portion.

The extension part 2300 includes a first extension part 2310, a second extension part 2320, a hinge part 2330, a first handle 2340 and a second handle 2350. The extension part 2300 may separate the first grip part 2100 and the second grip part 2200 from each other to extend a distance between one coil and the other coil of the coil spring.

The first extension part 2310 extends along a Y-axis direction to be connected to the first grip part 2100, and the second extension part 2320 extends along a Y-axis direction to be connected to the second grip part 2200.

A first protrusion part protruding in a −X-axis direction from a portion of the first extension part 2310 and a second protrusion part protruding in a +X-axis direction from a portion of the second extension part 2320 are fastened to each other to form the hinge part 2330.

The first handle 2340 is curvedly extended along a Y-axis direction to be connected to the first extension part 2330, and the second handle 2350 is curvedly extended along a Y-axis direction to be connected to the second extension part 2320. When a distance between the first handle 2340 and the second handle 2350 maintains an initial distance, a distance between the first grip part 2100 and the second grip part 2200 maintains a first distance. Meanwhile, as a distance between the first handle 2340 and the second handle 2350 maintains a smaller distance than the initial distance, a distance between the first grip part 2100 and the second grip part 2200 is maintained as a central axis larger than the first interval. Accordingly, a distance between one side coil and the other side coil gripped by the first grip part 2100 and the second grip part 2200, respectively, is increased.

The first grip part 2100, the first extension part 2310 and the first handle 2340 are integrally formed with each other.

The second grip part 2200, the second extension part 2320 and the first handle 2340 are integrally formed with each other.

The dental coil spring extension device according to another exemplary embodiment of the present invention may further include an elastic plate 2360 disposed between the first handle 2340 and the second handle 2350. The elastic plate 2360 maintains an initial distance between the first handle 2340 and the second handle 2350. That is, as a u'er's pressure is released in a state in which a distance between the first handle 2340 and the second handle 2350 is reduced by the user, the elastic plate 2360 maintains a distance between the first handle 2340 and the second handle 2350 at an initial distance.

The dental coil spring extension device according to another exemplary embodiment of the present invention may further include a self-limiting screw member 2370 limiting a maximum distance set between the first grip part 2100 and the second grip part 2200. The self-limiting screw member 2370 is rotated according to a u'er's manipulation, so that the maximum distance set between the first grip part 2100 and the second grip part 2200 may be varied. The self-limiting screw member 2370 may be disposed between the first handle 2340 and the second handle 2350.

As described above, according to the dental coil spring extension device according to another exemplary embodiment of the present invention, the extension part separating the first grip part for gripping one coil and the second grip part for gripping the other coil from each other includes a first extension part connected to the first grip part, a second extension part connected to the second grip part, a hinge part defined by fastening a first protrusion portion protruding from a portion of the first extension part and a second protrusion portion protruding from a portion of the second extension part to each other, a first handle connected to the first extension part, and a second handle connected to the second extension part. When the first handle and the second handle are in close contact with each other by a user, the first extension part and t elegacond extension part are spaced apart from each other with respect to the hinge part. A distance between the first extension part and the second extension part may extend the dental coil spring by separating the first grip part and the second grip part from each other.

Figure 8:
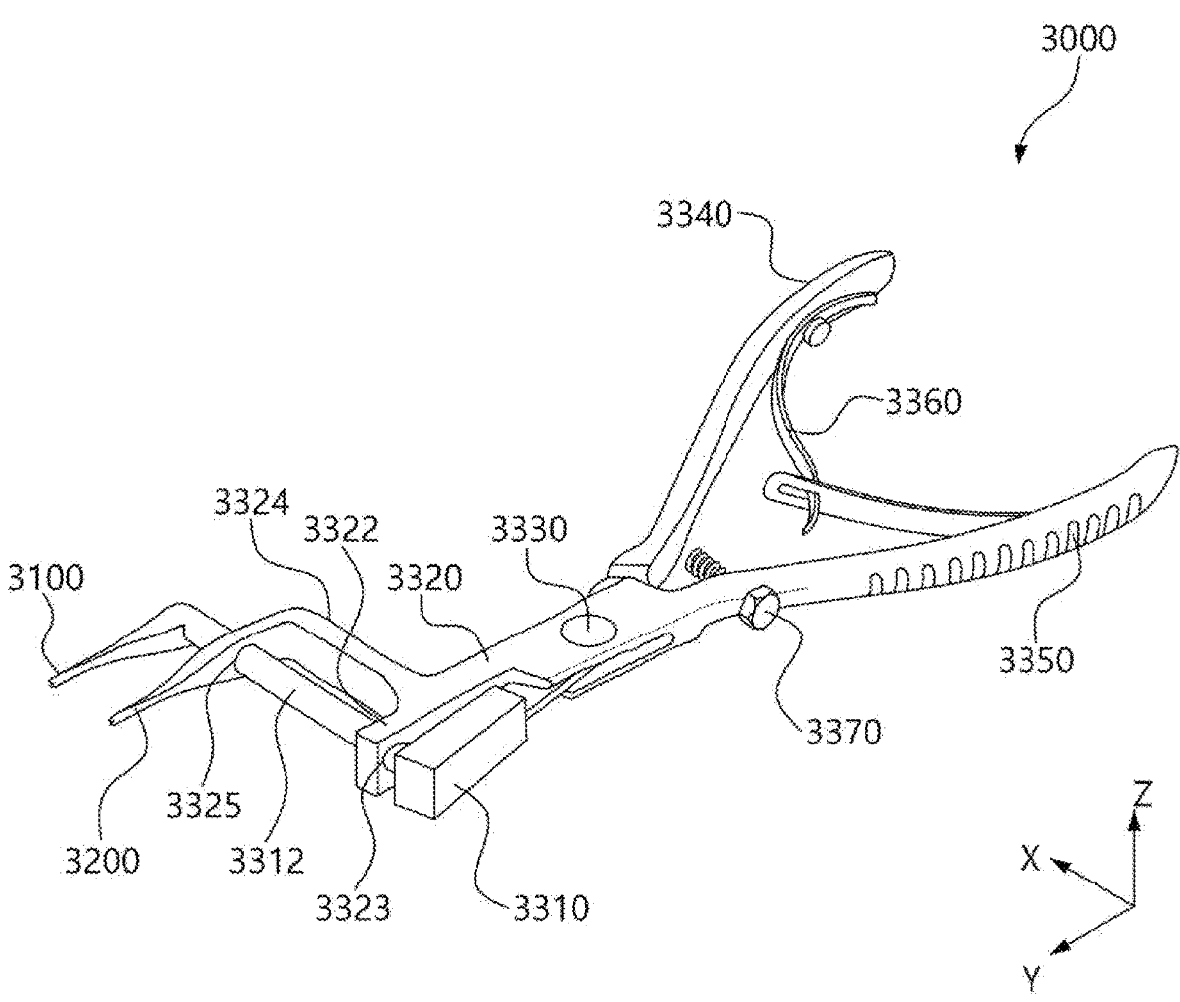
FIG. 8 is a perspective view schematically illustrating a dental coil spring extension device according to still another exemplary embodiment of the present invention.

FIG. 8 is a perspective view schematically illustrating a dental coil spring extension device according to still another exemplary embodiment of the present invention.

Referring to FIG. 8, the dental coil spring extension device 3000 according to still another exemplary embodiment of the present invention includes a first grip part 3100, a second grip part 3200 and an extension part 3300 to extend a pitch of a dental coil spring.

The first grip part 3100 protrudes along a Y-axis direction to grip one coil of the coil spring, and the second grip part 3200 protrudes along a Y-axis direction to grip the other coil of the coil spring.

Each of the first grip part 3100 and the second grip part 3200 includes a recessed portion formed to surround a peripheral of the coil of the coil spring. A thickness of the recessed portion becomes thinner as it approaches a center of the recessed portion.

The extension part 3300 includes a third extension part 3310, a penetration rod 3312, a fourth extension part 3320, a first branch part 3322, a second branch part 3324, a hinge part 3330, a first handle 3340 and a second handle 3350. The extension part 3300 separates the first grip part 3100 and the second grip part 3200 from each other to expand a distance between one side of coil and the other side of the coil.

The third extension part 3310 extends with a predetermined inclination angle with respect to a Y-axis.

The penetration rod 3312 includes one side rotatably connected to the third extension part 3310 and the other side connected to the first grip part 3100.

The fourth extension part 3320 extends along a Y-axis.

One side of the first branch part 3322 extends along a Y-axis from the fourth extension part 3320. The first branch part 3322 has a first penetration hole 3323 formed to pass through the penetration rod 3312.

The second branch part 3324 includes one side extending along an X-axis from the fourth extension part 3320 and the other side connected to the second grip part 3200. The second branch portion 3324 has a second penetration hole 3325 formed for a penetration of the penetration rod 3312.

The hinge part 3330 is formed in an area where the third extension part 3310 and the fourth extension part 3320 cross each other.

The first handle 3340 may extend curvedly along a Y-axis direction and is connected to the third extension 3310, and the second handle 3350 may extend curvedly along a Y-axis direction and is connected to the fourth extension 3320.

When an interval between the first handle 3340 and the second handle 3350 maintains an initial interval, the first grip part 3100 and the second grip part 3200 maintain a first interval with each other.

Meanwhile, as a distance between the first handle 3340 and the second handle 3350 is smaller than the initial distance, the third extension part 3310 moves toward the fourth extension part 3320 to move the penetration rod 3312 in an +X-axis direction. Accordingly, the first grip part 3100 connected to an end of the penetration rod 3312 is spaced apart from the second grip part 3200, so that a distance between one side coil and the other side coil gripped by the first grip part 3100 and the second grip part 3200, respectively, is extended.

The dental coil spring extension device according to another exemplary embodiment of the present invention may further include an elastic plate 3360 disposed between the first handle 3340 and the second handle 3350. The elastic plate 3360 maintains an initial distance between the first handle 2340 and the second handle 2350. That is, as a u'er's pressure is released in a state in which a distance between the first handle 3340 and the second handle 3350 is reduced by the user, the elastic plate 3360 maintains a distance between the first handle 3340 and the second handle 3350 at an initial distance.

The dental coil spring extension device according to another exemplary embodiment of the present invention may further include a self-limiting screw member 3370 limiting a maximum distance set between the first grip part 3100 and the second grip part 3200. The self-limiting screw member 3370 is rotated according to a u'er's manipulation, so that the maximum distance set between the first grip part 3100 and the second grip part 3200 may be varied. The self-limiting screw member 3370 may be disposed between the first handle 3340 and the second handle 3350.

As described above, according to the dental coil spring extension device according to another exemplary embodiment of the present invention, the extension part includes a third extension part, a penetration rod having one side rotatably connected to the third extension part and the other side connected to the first grip part, a fourth extension part, a first branch part having one side extending along a Y-axis from the fourth extension part and a first penetration hole formed for penetration of the penetration rod, a second branch part having one side extending along an X-axis from the fourth extension part and the other side connected to the second grip part to have a second penetration hole formed for the penetration of the penetration rod, a hinge part formed in an area where the third extension part and the fourth extension part intersect, a first handle connected to the third extension part, and a second handle connected to the fourth extension part. When the first handle and the second handle are brought into close contact with each other by a user, the first branch part and the second branch part are spaced apart from each other with respect to the hinge part. A distance between the first branch part and the second branch part may extend the dental coil spring by separating the first grip part and the second grip part from each other.

Typically, an open coil springs may move teeth approximately 1 mm per month. When the open coil spring is extended by about 4 mm in a state including two pitches using the dental coil spring extension device according to the present invention, the open coil spring is finally activated by about 3 mm.

When activating the open coil spring by including two pitches, the load deflection rate of the open coil spring may be most effective. That is, when the dental coil spring extension device according to the present invention opens the open coil spring by about 4 mm, a free length of the open coil spring finally increases by about 3 mm.

As described above, according to the present invention, by extending the pitch of the dental coil spring, it is possible to increase the load deflection rate of the dental coil spring itself, thereby eliminating the need for additional crimpable stops or arch wire replacement.

In addition, there is no need for an additional instrument, and there is no worry about suctioning of the additional instrument by a patient.

In addition, there is no need elegateate the archwire. In addition, the time to extend the dental coil spring is very short.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A dental coil spring extension device comprising:

a first grip part for gripping a first coil of a coil spring;

a second grip part for gripping a second coil of the coil spring; and an extension part separating the first grip part and the second grip part to expand a distance between the first coil and the second coil, wherein each of the first grip part and the second grip part includes a recessed portion formed to surround a periphery of each of the first coil and the second coil of the coil spring, wherein the extension part comprises:

a thumb grip part connected to the first grip part;

a residual finger grip part connected to the second grip part; and a gap setting part disposed between the thumb grip part and the residual finger grip part to set a distance between the first grip part and the second grip part, wherein the gap setting part comprises:

a gap adjusting cylinder having one side fastened to a hole formed in the thumb grip part;

a gap adjusting plate disposed in an area in which a portion of an outer peripheral surface of the gap adjusting cylinder is opened and fastened to the hole formed in the thumb grip part; and a gap adjusting rod having a cylindrical shape and disposed inside the gap adjusting cylinder to set the distance between the first grip part and the second grip part.

2. The dental coil spring extension device of claim 1, wherein a thickness of the recessed portion becomes thinner as a distance from a center of the recessed portion is decreased.

3. The dental coil spring extension device of claim 1, wherein the gap adjusting rod comprises:

a spring guide for guiding a coil spring;

a wide width setting part formed at a first height;

a narrow width setting part formed with a second height greater than the first height; and a gripping portion fastened to the residual finger grip part through a hole formed in the gap adjusting cylinder.

4. The dental coil spring extension device of claim 3, wherein the gap adjusting rod further comprises:

a gap adjusting dial that rotates according to a user's manipulation to change positions of the wide width setting part and the narrow width setting part within the gap adjusting cylinder.

* * * * *